United States Patent [19]

Lien et al.

[11] 4,245,405
[45] * Jan. 20, 1981

[54] MACHINE FOR TEACHING READING

[75] Inventors: Ming T. Lien, Del Mar, Calif.; Eric F. Burtis, 167 Constitution Dr., Menlo Park, Calif. 94025

[73] Assignee: Eric F. Burtis, by said Ming T. Lien Menlo Park, Calif.

[*] Notice: The portion of the term of this patent subsequent to May 1, 1996, has been disclaimed.

[21] Appl. No.: 34,681

[22] Filed: Apr. 30, 1979

Related U.S. Application Data

[63] Continuation of Ser. No. 913,283, Jun. 7, 1978, Pat. No. 4,151,659.

[51] Int. Cl.³ .............................................. G09B 7/02
[52] U.S. Cl. .................................... 434/178; 434/167
[58] Field of Search ................. 35/35 R, 35 B, 35 D, 35/31 C, 6, 8 R, 9 R, 9 A, 9 B; 364/419

[56] References Cited

U.S. PATENT DOCUMENTS

| | | | |
|---|---|---|---|
| 3,121,960 | 2/1964 | Uttal et al. | 35/35 R X |
| 3,252,230 | 5/1966 | Donev | 35/35 D X |
| 3,281,959 | 11/1966 | Kobler et al. | 35/6 |
| 3,414,985 | 12/1968 | Ashley | 35/8 R |
| 3,584,398 | 6/1971 | Meyer et al. | 35/31 C |
| 3,787,988 | 1/1974 | Kakajima et al. | 35/31 R |
| 3,854,226 | 12/1974 | Divine et al. | 35/31 C |
| 3,894,346 | 7/1975 | Ward et al. | 35/6 X |
| 3,947,976 | 4/1976 | Hafel | 35/31 C |
| 3,999,307 | 12/1976 | Tsuda et al. | 35/9 A |
| 4,055,907 | 11/1977 | Henson | 35/9 R |
| 4,151,659 | 5/1979 | Lien et al. | 35/35 D |

Primary Examiner—William H. Grieb
Attorney, Agent, or Firm—Fulwider, Patton, Rieber, Lee & Utecht

[57] ABSTRACT

A machine for teaching students to read is equipped with a visual display, a manual keyboard for entering alphabet letter responses, correctness and incorrectness indicators of display responses, and conditioning means for initiating particular grammar characteristic sequences to be practiced. The machine also includes a repertoire of words and letter combinations corresponding to word roots encoded in an electronic form and stored in digital memory. A word set is assembled in response to an instruction from the conditioning means concerning the word structure characteristic sequence to be practiced. Words or word roots are selected at random from the assembled word set for display or partial display. The student, through the keyboard, is thereby able to identify particular vowels and consonants, long and short vowel sounds, soft and hard consonant sounds, determine the number of syllables in a word, identify misspelled words, supply missing letters, and identify words as to their grammatical parts of speech. The correctness and incorrectness indicators inform the student as to the accuracy of the manually entered response.

15 Claims, 4 Drawing Figures

MACHINE FOR TEACHING READING

This is a continuation of application Ser. No. 913,283, filed June 7, 1978, now U.S. Pat. No. 4,151,659, issued on May 1, 1979.

BACKGROUND OF THE INVENTION

1. Field of the Invention

The present invention relates to a device dedicated for use as a teaching aid and capable of operation by a student requiring instruction and practice in reading.

2. Description of the Prior Art

In the past, various devices have been devised for use in aiding students to learn to read and to improve their reading ability. For example, printed learning aids have been devised which display certain words in a predetermined sequence and which allow a student to respond to a common question concerning a word structure characteristic posed with respect to all of these words. That is, a student may be required to provide a written response identifying all misspelled words, all nouns, all words with soft consonants, and so forth. The simplest form of devices of this type is a booklet presenting the words and questions in printed form, although more sophisticated devices are also available.

Other more dynamic teaching aids have also been used, but with only limited success. One class of such machines employees a multiplicity of cards imprinted with magnetic ink. The cards are inserted into a decoder which provides an audio output pronouncing a particular word and contemporaneously displaying the printed form of the word. Such devices operate by propelling the magnetic ink section of the card past magnetic read heads which decode the imprintation to produce an audio output. The student thereafter pronounces the word orally. A microphone picks up this oral response and records it. The student can then compare the response with the oral sample pronunciation. The problem, however, particularly with young children is that with such devices the student is in effect, required to select his own problem and then solve it. Unless supervised, children tend to choose easy problems, with which they quickly become bored. They then tend to abandon the task with little attention to the problems at the level of difficulty in which they really require instruction.

SUMMARY OF THE INVENTION

The present teaching machine is fundamentally different from prior art devices in that selection of words or letter groups corresponding to word roots is not predictable. The problems posed are not at the discretion of the student, and are not predetermined or pre-programmed, such as in a workbook. Rather, selection of words or letter groups from among a set is performed randomly by electronic means.

Random problem selection has in the past been performed in connection with teaching arithmetic, and arithmetic problems have been visually presented in a context to elicit a manual response through a keyboard. U.S. Pat. No. 3,584,398 describes and explains the operation of such a device. However, until the present invention, the intricacies of language word structure and the complexity of the rules of word structure characteristics have dictated against the use of a visual display and keyboard console arrangement for use in teaching reading.

The present invention includes a visual display, a keyboard upon which letters of the alphabet and numbers are provided for encoding a student response, and in which other keys are used to establish a mode of operation. Once the language characteristic to be taught is established, the machine of the invention operates automatically by assembling a particular word set or a set of particular letter combinations corresponding to roots of words, depending upon the mode selected. Each set contains a multiplicity of words or letter combinations in encoded form particularly suited for instructing the student in the aspect of reading desired. For example, one word set is established to contain words having typical vowel sound groups. Another word set contains a large number of words beginning with a particular constant. Similarly, yet another word set contains a large number of words representing long and short vowel sounds. In similar fashion, word sets are established for use in teaching a student to identify hard consonant sounds, soft consonant sounds and to determine the number of syllables in a word. By the same token, word sets can be established to drill a student in identifying silent consonants and S and Z sounds. Still other word sets are assembled which are useful in teaching a student to correctly identify the grammatical parts of speech, such as nouns, pronouns, verbs adverbs, etc.

The reading teaching machine of the invention may be constructed so that control of the rate of presentation may lie either with the student responding to the word presentations, or on a timed basis. That is, a response from the student may be required to advance the display to the next randomly selected word, or alternatively the next sequential word will appear automatically at prescribed cyclical intervals.

One aspect of operation of the device when arranged to present words at timed intervals is a mode of tachistoscopic teaching. In tachistoscopic teaching, words are displayed only momentarily, from two seconds, to as little as 0.01 seconds, depending upon the reading capability of the student. The display of words for extremely small intervals of time allows an individual to optically perceive all or only part of a word during the viewing interval. However, before mental analysis progresses very far, the visual image of the printed form of the word is removed from view, so that the individual being taught is forced to mentally reconstruct the image of the word perceived for mental identification. Normally the tempo of operation in this mode is sufficiently rapid so that keyboard responses are neither necessary nor desirable. The individual simply pronounces the word and does not receive any indication of correctness or incorrectness. Rather, the rapidity of changes in the display sets a tempo that is exciting, and thus rewarding to the student. Continued practice sharpens the students perceptive senses and time that actual viewing of a word is required for mental reconstruction and identification of the word. Accordingly, an embodiment of the invention designed solely for this purpose requires no keyboard nor any indicators for correctness or incorrectness of a response, although preferably tachistoscopic viewing represents but one mode of operation of a more elaborate and flexible embodiment of the teaching machine of the invention.

To teach other aspects of characteristics of word structure, however, it is desirable for the student to provide an indication of recognition of a particular word structure characteristic, and for the student to be informed of the correctness of this indication. Recognition of vowel sounds, long and short vowels, hard and soft consonants, and identification of syllables and demarkation between syllables normally require such a conscious response and evaluation and provision of a signal of correctness or incorrectness of the response for learning to proceed satisfactorily.

In a typical operation of the device of the invention, words are presented at random from within a group in a series of twenty, thirty, fifty or one hundred words. The words are initially selected and stored with common usage forming a significant consideration. The student then presses a key which he associates with each of those words in response to the sequential display of the words. The machine of the invention also contemporaneously associates a particular correct key with each word as it is displayed, and evaluates the response of the student as correct or incorrect. For example, if the correct key is depressed, a green light or a smiling face may be illuminated and a new word may then be displayed either automatically, or in response to a further action by the student pressing a key advancing operation of the device. For example, the student may be required to identify the word as a noun, verb, or other grammatical part of speech. If the response is correct, the device advances, if the response is incorrect, the word is repeated and an incorrectness indication, such as a red light or a frowning face appears. The student must then correctly identify the part of speech of the word displayed before the machine can be advanced.

Keys corresponding to numbers of syllables and numbered 1, 2, 3, etc. are also provided. When a word is displayed, the student mentally determines the number of syllables in the word and depresses the corresponding numbered key. If this correctly identifies the number of syllables in the word, another word appears. If incorrect, the display is altered by increasing the linear separation between letters of adjacent syllables, and the student is required to respond again. After the student has completed a series of ten, twenty, or fifty words, for example, the response score and the elapsed time are automatically displayed.

The device of the invention can also be used to teach spelling. Words are broken into difficulty levels of spelling groups, or groups in which particular spelling rules are emphasized. The words may be presented first for visual identification. The word list may then be presented, with words of the list appearing at random, and with some words obviously misspelled. The student must respond by depressing a key indicative of correct or incorrect spelling as each word appears. If the student depresses the wrong key, he may thereafter be required to key in the correct spelling of the entire word using the alphabetic character keys. The machine either confirms the response of the student, or indicates disagreement and proceeds to the next word. Also, if a misspelled word appears and the student correctly responds to this fact, the student may be required also to key in the correct spelling of the words. The student is scored on the total number of correct indications of right or wrong and may be given a secondary score if he respells correctly those words displayed in misspelled form.

In an alternative manner of operation in the spelling mode, words are presented with certain letters in each word blanked out. The student must then key in the correct letter or letters to complete the word. Levels of difficulty may be provided with one letter missing or the student may progress to two or even three missing letters. The student is timed and scored at the end of a given series of words.

In another mode of operation, words are presented with beginning consonants missing. The student is then required, using the alphabet letter coded keys of the keyboard, to supply the missing consonant. As an alternative, the ending consonant may be missing, or both the beginning and ending consonants may be missing.

In another manner of operation, the student may be called upon to identify hard or soft constant sounds by depressing one of two keys provided for making such an indication. Similarly, long or short vowel sounds may be identified by striking the proper key. Also, words may be presented with vowels blanked out so that the student is required to supply the missing vowel using the keys of the keyboard.

In another manner of operation, word roots are displayed to which suffixes can be added. Such word roots may be selected in advance for use in a word set to illustrate typical suffixes such as -en, -er, -ish, -ful, -ly, and so forth. The student keys in the suffix and is informed as to the correctness or incorrectness of the response. Where more than one suffix can be added to the word root presented and still retain meaning, any correct suffix is accepted, but the display of the word root is repeated to alert the student that a second or third suffix can be added. A student receives a grade according to the total number of suffixes added out of a possible maximum total.

A further possible feature of the invention is the provision of a cursor which may be used to select particular locations on the display. For example, the student may be required to direct the cursor to the demarkation between syllables in a word, and to depress a key or button indicative of this selection in order to register the position selected. The indicators for correctness and incorrectness inform the student as to the accuracy of the response. The cursor may be moved to either the right or the left in keys on the keyboard. Momentary depression of one key directing the cursor to the left moves a lighted demarkation arrow on position to the left. Prolonged depression will move the demarkation arrow several positions to the left until pressure on the key is released. Similarly, depression of another key on the keyboard, provided for that purpose will cause the demarkation arrow to move to the right one or several positions.

The invention may be described with greater particularity and clearity by reference to the accompanying drawings. To avoid confusion, it should be understood that the term "word" as used herein, refers to a human language word, and not to a sequence of electronically encoded binary bits, as that term is sometimes used in electronic parlance.

DESCRIPTION OF THE EMBODIMENT

Figure 1:
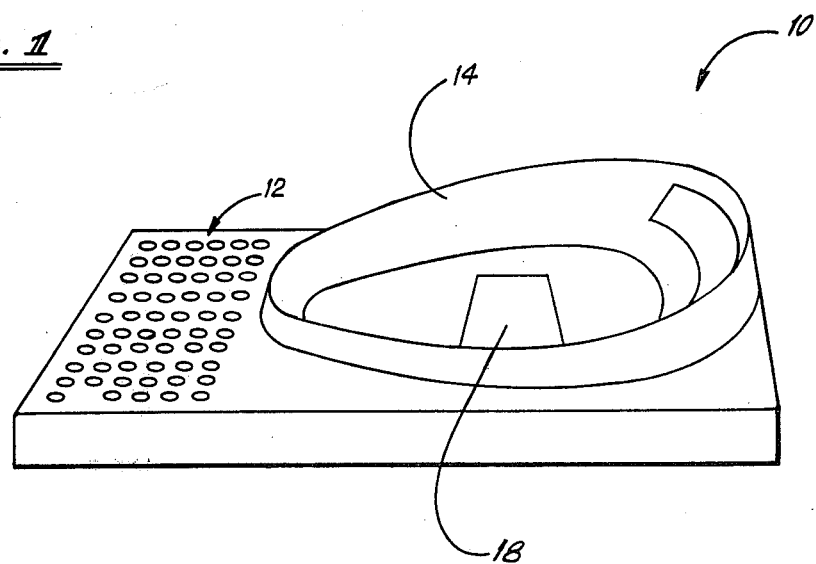
FIG. 1 is perspective view of one embodiment of a machine for teaching reading according to the invention.

FIG. 1 depicts a portable machine 10 for teaching students to read. The feature of portability allows the device to be readily stored, so that a permanent location for the machine 10 is unnecessary. Normally, the machine 10 will be operated from conventional a.c. house current, transformed to d.c. by a rectification network. The machine 10 includes a keyboard, indicated generally at 12 in FIGS. 1 and 2, having manually actuable switches in the form of depressable push buttons 16 the layout of which is illustrated in detail in FIG. 4. The keyboard 12 is located beneath a raised stadium shaped display panel mounting having a raised rim 14 extending about the perimeter thereof in a closed curved configuration depicted in FIG. 2. A display panel 18 is located on the floor of the mounting within the encircling confines of the rim 14. The display panel may be an LED display, a liquid crystal display but preferably is a dot matrix display. Above the display panel 18, and extending in a curved arcuate arrangement across the inner surface of the rim 14 is an instruction and score panel 20. At either end of the score panel 20 are located a correctness indicating green light or smiling face 22 and an incorrectness indicating red light or frowning face 24. The display panel 18 is used for providing a visual display of words by generating images of words internally transmitted thereto in electronically encoded form from the circuitry depicted in FIG. 3.

ELECTRONIC ORGANIZATION

Figure 3:
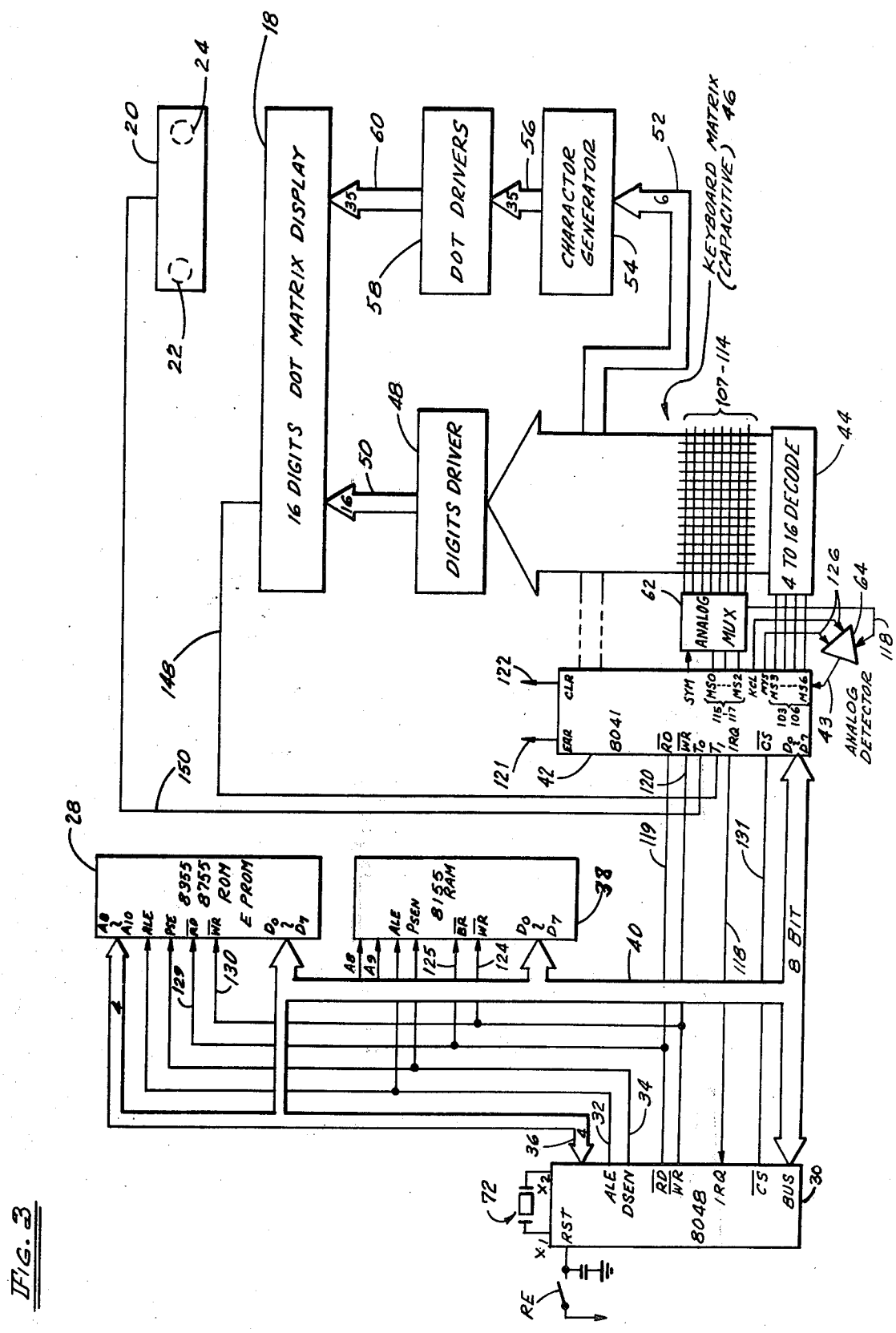
FIG. 3 is a block logic diagram of the electronic components of the embodiment of FIG. 1.
Figure 4:
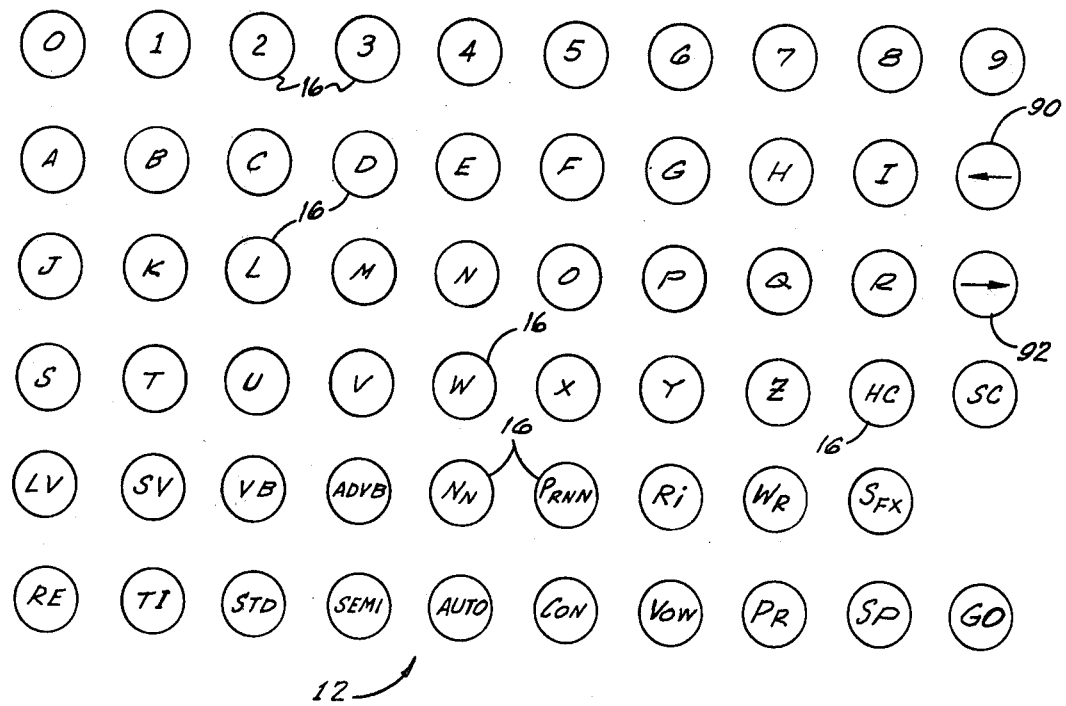
FIG. 4 is a detail plan view of the keyboard of the embodiment of FIG. 1.

With reference to FIG. 3, a word storage device, such as a model 8355 ROM or model 8755EPROM 28 manufactured by Intel Corporation of Santa Clara, Calif. is used for storing words in sets. The words in the ROM 28 are stored in sets in an electronically encoded form, and words from the sets are separately selected at random and according to predefined ratios from each set in response to separate actuation of several of the switches 16 which correspond to characteristics of word structure, and which are indicated in FIG. 4.

A central processor 30, such as the Model 8048 microcomputer, also manufactured by Intel Corporation is provided to serve a number of functions. The microcomputer 30 includes a cycling selector which is connected by a 4-bit address bus 36 to address the ROM 28. The cycling selector sequentially addresses word storage locations in the sets dictated by the mode of operation and stored in ROM 28. The cycling selector randomly selects words from among words addressed and stored in the ROM 28 by depression of specific ones of the control buttons corresponding to grammatical characteristics indicated in the lower portion of FIG. 4. The randomly addressed word is transmitted letter by letter on the data bus 40 from the ROM 28 to the microcomputer 30, stored in a buffer storage section 38 until all letters of the word have been withdrawn from storage, and from there is transmitted to the sixteen digit dot matrix display 18 for generation of an image of the word for visual observation.

The microcomputer 30 also includes a section for internally associating a particular one of the manually actuable push button switches 16 in the keyboard 12 with each of the words displayed. The microcomputer 30 also includes a comparison section for sensing actuation of a manually selected switch 16, and for ascertaining whether the selected switch is the switch internally associated with the image in the display 18. The comparator section of the central processor 30 then provides an output indicative of the comparison results to the correctness indicator 22 and the incorrectness indicator 24.

The reading teaching machine 10 also includes a buffer storage section 38, which may be a model 8155 data memory and I/O expander (RAM) also manufactured by Intel and connected to ROM 28 and microcomputer 30 by an eight bit data bus 40. The data bus 40 also connects the central processor 30 to a subordinate decoding processor 42, which may be a model 8041 central processing unit likewise manufactured by Intel. The slave microcomputer 42 includes multiplexed connections from a four bit to sixteen bit decoder interface circuit 44. From the decoder interface circuit 44, sixteen lines extend to a capacitive keyboard matrix, indicated generally at 46 and having separate capacitors associated with each of the keys 16 in the keyboard 12. The capacitive matrix 46 also includes output connections to a digit driver control 48 which in turn is connected to the dot matrix display 18 by bus lines indicated collectively at 50.

The slave microcomputer 42 includes a six bit data bus connection 52 to a character generator 54. Data on the bus lines 52 is carried in a conventional ASCII code to the character generator 54, which transforms the ASCII code to a pattern of 35 signals which appears on a bus 56. The bus 56 is connected to a dot driver section 58 which supplies the necessary power to illuminate dots for visual observation in the display 18. The dot driver section 58 is connected to the display 18 by a line 35 line data bus 60.

Interposed between the keyboard matrix 46 and the decoder processor 42 is an analog multiplexing circuit indicated at 62 which includes an output to an analog detector 64. This detector is used to register the depression of one of these switches 16 in the keyboard 12.

DECODER

The four bit to sixteen line coder 44 is connected to the slave microcomputer 42 by the four lines labelled 103-106 in FIG. 3. Encoded outputs to the decoder 44 are provided on lines 103-106 in binary form to sequentially provide a signal on each of the sixteen lines to the capacitive matrix 46. Closure of one of the switches 16 in the keyboard 12 discharges the capicator associated with that particular key 16 in the keyboard matrix 46. This capacitive discharge is detected by the analog multiplexor circuit 62, which determines which of the eight lines 107-114 has been activated. This information is fed as a binary code on lines 115-117 to the slave microcomputer 42. Since the synchronization of the appearance of signals on each of the sixteen lines from the decoder 44 is controlled by a sync signal generated within the microcomputer 30 and processed through slave microcomputer 42, the slave microcomputer 42 is able to accurately identify the particular key 16 which has been depressed.

When a signal is received on one of the lines 107-114 by the analog multiplexer 62, a switch activation signal is transmitted from the analog multiplexer 62 to the analog detector 64 on line 99. The analog detector 64 in turn transmits an inhibit signal on line 43 to the slave microcomputer 42 to prevent the registration of any further switch signals on lines 115-117 for a brief interval. This is a key debouncing feature which prevents the redundant registration of a signal which might otherwise be caused by repeated signal resulting from operation of one of the keys 16.

Also, lines 126 to the analog detector from the slave microcomputer 42 amplify the very small signal provided to the slave microcomputer 42 from the analog multiplexer 62 to indicate activation of a switch 16 and discharge of a capacitor in the keyboard matrix 46. The amplified signal indicative of switch activation appears on line 43.

In addition to providing a signal to the analog multiplexer 62, operation of one of the keys 16 generates an output to the digit driver control 48. The digit driver control 48 in turn provides output signals to the dot matrix display 18 on bus 50 to cause a visual image of the letter, or, numeral word structure characteristic associated with the activated key and indicated in FIG. 4 to appear in the proper one of the sixteen different bit positions.

SLAVE MICROCOMPUTER

When a switch activation signal is received on line 43 by the slave microcomputer 42, the slave microcomputer 42 informs the master microcomputer 30 of this event by a signal on the interrupt request line 118. This causes the microcomputer 30 to respond by going into a particular program subroutine associated with switch activation at that stage in the cyclic operation of the teaching machine 10. Ordinarily, the microcomputer 30 will respond to the interrupt request signal on line 118 by transmitting a READ signal to the slave computer 42 on line 119. This prompts the slave microcomputer 42 to transmit a six bit encoded representation of the activated switch 16 on the eight bit data bus line 40. The encoded representation utilized by the slave microcomputer 42 is the conventional ASCII code, with certain punctuation codes in ASCII code being used to represent the word structure characteristic keys in the keyboard 12 indicated in the lower portion of FIG. 4. Since ASCII code is only six bits in length, two of the eight bit data bus lines in the bus 40 are unused in transmitting ASCII code from the slave microcomputer 42 to the master microcomputer 30.

At other points in the functioning of the teaching machine 10, the slave microcomputer 42 is called upon to write certain ASCII code information. The slave microcomputer 42 is commanded in this manner by a signal on the WRITE line 120. When a signal appears on line 120, the slave microcomputer 42 responds to an ASCII code signal received from data bus 40 and transmits this code on bus 52 to the character generator 54 to ultimately cause the appearance of an image of that character in the display 18.

The microcomputer 30 and the slave microcomputer 42 are maintained in synchronization with each other by means of a communication line 131. The signals on communication line 131 serve as sync signals so that demarkations between encoded letters as transferred between the master microcomputer 30 and the slave microcomputer 42 are clearly marked.

The slave microcomputer 42 also includes an error output line 121 and a clear input line 122. The error output line 121 can be connected to a visual indicator of malfunction in the display 18, or it can be tied to the clear line 122, which will in effect erase the encoded signal for the activated switch 122 if an erroneous code exists.

DISPLAY

The sixteen digit dot matrix display is a conventionally commercially available gas discharge fluorescent display, and may be purchased either from Burroughs Corporation of Detroit, Mich. or from Noritake, Ltd. of Tokyo, Japan. This display responds to both the bus 50 from the keyboard matrix 46 and to the bus 60 which derives its input from the slave microcomputer 42. The ASCII coded signals appearing on the bus 52 from the slave microcomputer 42 are transformed by the character generator 54 into a pattern of illuminated dots with darkened spaces where dots are not illuminated, one pattern being associated with each of the digit positions in the display 18. These patterns of signals are transmitted on the bus 56 to latch the dot drivers in the dot driver section 58 to ensure that the proper dots are illuminated at each digit position in the display 18. The digit positions themselves are cyclically enabled at a rate undiscernible by the human eye. Although only a single digit position is enabled at any given point in time, the persistence of illumination of the display 18 causes all of the digit positions to appear to be continuously illuminated in its own particular pattern, depending upon the dot pattern directed to those digit positions.

The character generator 54 may be an external circuit component, as indicated in FIG. 3, or alternatively the character generator function may be performed internally within the slave microcomputer 42. In this latter instance, the signals on the six line bus 52 would have to multiplexed to enable the dot drivers in the driver section 58 in separate patterns associated with each of the digit positions.

MASTER MICROCOMPUTER

Upon detection of activation of one of the switches 16, the slave microcomputer 42 encodes the identity of that switch in ASCII code for transmission to the master microcomputer 30. Concurrently, the slave microcomputer 42 generates an interrupt request signal to the master microcomputer 30 on line 118. To service the interrupt request, the master microcomputer 30 examines the ASCII code delivered to it on the bus 40. If the switch identification shows that the switch corresponds to a word structure characteristic, as indicated in the lower portion of the keyboard 12 in FIG. 4, the master microcomputer 30 begins to work its way through a program tree. A program tree is a general program for finding the specific program which should be used to process further inputs from the keyboard 16. After progressing through a sequence of options in the program tree, the microcomputer 30 draws the particular program instruction block which is to be used from the ROM 28. The address for the particular subroutine to be employed is transmitted to the ROM 28, on the bus 36. The program subroutine to be employed is then loaded into the microcomputer 30 from the ROM 28 via bus 40.

Within the program subroutine, particular word set addresses in the ROM 28 are defined along with a proportion of words to be chosen from each word set. A word set address defines the particular sequential block of address locations within the ROM 28 where words having particular grammar characteristics and which are to be selected for imaging on the display 18 are located. The microcomputer 30 then rapidly cycles through these addresses, although no words are withdrawn since the address enable time is not enabled. The appearance of an interrupt request signal on line 118 causes the microcomputer to direct a pulse on the address enable line to select the word currently addressed and to read it from the ROM 28 on bus 40. Because the manual activation of one of the buttons 16 causes the interrupt request signal on line 118, and because the time of occurrence of this signal is unpredictable relative to the rapid cycling through the addresses, the specific word addressed is determined in random fashion.

A crystal 72 is provided for the system to deliver clock pulses at from one to six megohertz. Preferably, about a two megahertz clock is utilized. These clock pulses counter within the microcomputer 30 which is being strobed by the crystal 72 is latched to define the position within the word set address block which will be specifically addressed by the microcomputer 30. The counter defining the precise address position is latched until the entire word has been read out of ROM 28 into the microprocessor 30 over bus 40. Thereafter, the latch is released and the counter is allowed to continuously recycle to redefine the exact address position. Because activation of a switch 16 occurs at a rate which is totally unpredictable, the time of appearance of the interrupt request signal on line 118 relative to the cycling of the counter is likewise unpredictable. As a consequence, the address selection within the word set address block is random, or at least psuedo random.

Once the address to the word memory location in ROM 28 is selected, the latched count is treated as the base address until all of the letters of the particular word to be displayed are withdrawn from ROM 28 by the microcomputer 30 and transmitted to the temporary memory storage in RAM 38. Once a word is complete, the microcomputer signals the RAM 38 to transfer it to the slave microcomputer 42 on bus 40 for display on the display 18. Only at that time will the address counter latch be released so that another random selection within the word memory block in the ROM 28 can be performed.

In response to signals on the READ line 119 from the microcomputer 30, the ASCII code for the contents of the location or the addressed program location are transmitted from ROM 28 on the bus 40 to the microcomputer 30. As each letter of a word is received from the word set by the microcomputer 30, it is transmitted into temporary memory storage in the RAM 38. In addition to the ASCII codes stored in the ROM 28 in association with each of the letters of a word to be displayed, the memory storage for the words in ROM 28 includes certain additional code bits which are used for control functions. That is, certain additional code bits are employed in association with words stored with the words in the ROM 28 to identify particular characteristics of word structure associated with the program subroutine involved with the word. For example, each word in a word set for the subroutine for practicing long and short vowel sounds identifies the word as representing either a long vowel or a short vowel. This identification is in the form of a code transmitted with the word to the microcomputer 30. This information, along with the word itself, is stored in the RAM 38 once the word has been selected and read out from the ROM 28.

Once a switch 16 is depressed by the student in response to display of the word after it is transmitted to the display 18, the slave microcomputer 42 decodes the ASCII code of the switch depressed for use thereafter in determining the correctness or incorrectness of a student response. Also, initially, the ASCII code of the control key 16 depressed determines the program identification and address transmitted by the microcomputer 30 to the ROM 28 to withdraw the instructions of a program subroutine. Once a word has been imaged on the display 18, the slave microcomputer 42 encodes the switch depressed according to the presence or absence of a characteristic of word structure. For example, when the teaching machine 10 is performing a subroutine designed to display vowel sounds to students, each word displayed from the words assembled in the vowel sound word set by the microprocessor 30 from words stored in the ROM 28 includes a code indicative of whether or not the word represents a long vowel sound or a short vowel sound. The short vowel sound may be accompanied by the code 1, stored at a prescribed bit position in ROM 28 in association with that word, while the long vowel sound may be represented by the code 0. If the word displayed is representative of a short vowel sound, a flag bit, corresponding to the code 1, is set in the logic circuit in the microcomputer 30. If the student recognizes the word as being representative of a short vowel sound and presses the key 16 labelled SV (FIG. 4), the slave micromputer 42 generates the code "1" associated with the depression of that key in the particular program subroutine used at the time. This code is transmitted to the microcomputer 30 on the bus 40 currently with the generation of the interrupt request signal on line 118. The interrupt request signal causes the microcomputer 30 to compare the flag bit with the code received from the slave microcomputer 42. If the flag and key code match, the microcomputer 30 generates a signal indicative of a correct response and proceeds to lift the latch of its internal random sequence counter to select another word. If there is a mismatch, on the other hand, a signal is passed to activate the incorrectness indicator 24 in FIG. 2. In such as instance, the program subroutine may be conditioned to redisplay the same word until a correct signal is received from the SV switch 16.

Figure 2:
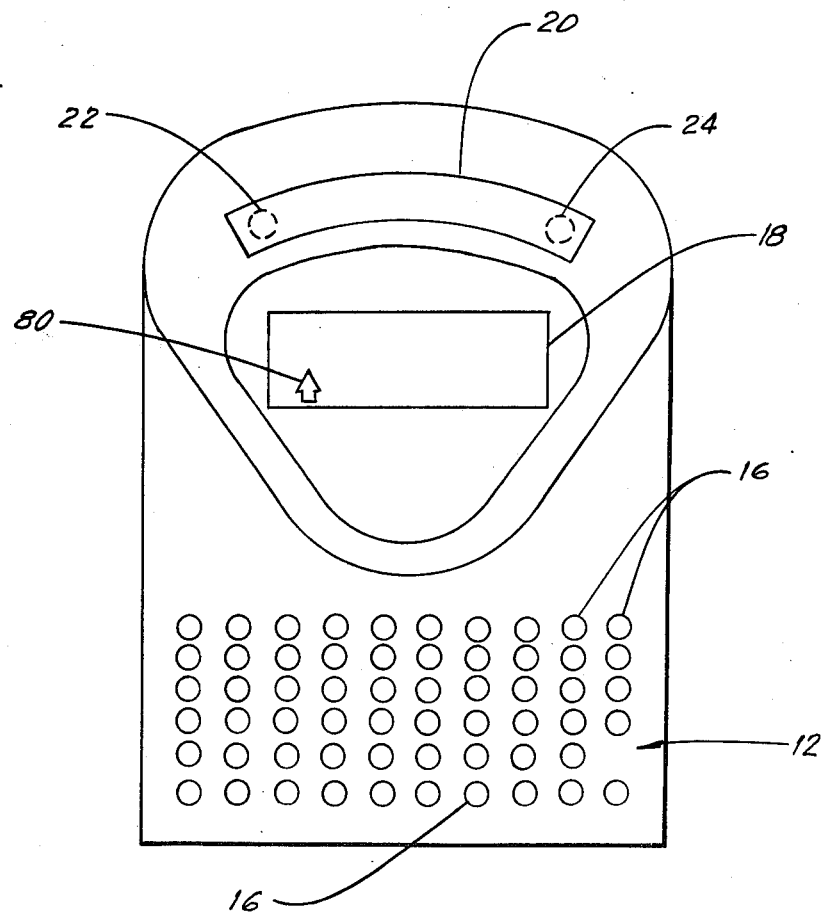
FIG. 2 is a top view of the embodiment of FIG. 1.

While identifying a word as representing sounds of hard consonants, long vowels, short vowels, and parts of speech requires only a very straight forward alternative encoding of words assembled into word sets by the microcomputer 30, other subroutines require more complicated encoding. For example, when the microcomputer 30 is operating in the SUFFIX mode only the word root will be maintained in ROM 28, along with the code for generating the suffix. The code in this instance identifies the rule of word structure governing proper suffixes and their spellings for each word. For example, if the root word is RUN, a code such as 10101 may be associated with it. This code may indicate that the word is a verb that ends in a consonant and that the consonant is the letter N. When this code is received by the microcomputer 30, the machine branches to a subroutine for determining valid suffixes. Because the word is a verb, an ING ending forms a proper suffix. However, because the word also ends in the letter N, the final consonant must be repeated with letters ING following in order for the spelling of the word RUNNING to be correct. Similarly, the same subroutine will generate the proper suffix NER as another acceptable suffix associated with that word. These suffixes are temporarily stored in the RAM 38 while the student attempts to provide suitable suffixes to the root word RUN. As the student depresses the alphabet letter keys 16 of FIG. 4 to form suffixes, the ASCII code for the letters represented by these keys is compared with the ASCII code stored with the letters of the suffixes in the RAM 38. As long as there is a match, the student is allowed to continue uninterrupted, and when the suffix has been completed the correctness indicator 22 in FIG. 2 is illuminated. However, if an improper letter for a suffix is entered through the keyboard 12, there will be a mismatch in the comparator in the microcomputer 30 so that the incorrectness indicator 24 is thereafter illuminated.

Once the subroutine has been completed with respect to a particular root word, the suffixes in the RAM are erased by writing in zeroes in the suffix storage location upon activation of the write line 124 in FIG. 2. Conversely, words are written into the RAM 38 from the microcomputer 30 by activation of the READ line 125 and concurrent transmittal of word data on bus 40.

When inaccuracies are detected in student responses, such as in forming suffixes or in supplying missing letters in spelling subroutines, the display 18 is momentarily blanked and the same word or letter combination is displayed for one or more times until a correct response is provided by the student or until the subroutine directs the slave microcomputer 42 to display another word.

PERMANENT MEMORY STORAGE

The permanent memory storage is provided by the ROM 28. A bus 36 to ROM 28 allows addresses to be transmitted from the microcomputer 30. The data bus 40 provides for bidirectional transmission of data information. The read line 129 places data at an addressed ROM memory location on the data bus 40, while a write 130 is inactive. The ROM 28 is utilized to store both the program instructions in subroutine memory locations, and also the words in word storage memory blocks. The words are stored sequentially in predetermined order in the ROM 28, although the order in which they are addressed within a word set is varied in random fashion as previously described. The contents of the ROM 28 do not change and the information therein remains stored even when power to the system is turned off.

Particular words for assembly into word sets by the microcomputer 30 are stored in the ROM 28 in address locations corresponding to particular structural characteristics of words. That is, a block of verbs may be stored at locations 01–08, adjectives may be stored at locations 11–16; prepositions may be stored at location 17–27 and so forth. Similarly, words beginning with hard consonants may be stored at locations 50–58; words beginning with soft consonants may be stored at locations 59–67, words having long vowel sounds may be stored at locations 68–75; and words having short vowel sounds may be stored at locations 76–83. In like manner, suffix word roots, and valid suffix endings associated therewith and misspelled versions of words stored elsewhere may likewise be stored in memory blocks.

TEMPORARY MEMORY STORAGE

The RAM 38 is provided to serve as a temporary memory store. As the letters of a word in a word set, stored in the ROM 28, are transmitted to the microcomputer 30, they are restored sequentially in the RAM 38 by the microcomputer 30. The microcomputer 30 maintans the address of the initial position of memory storage of letters of words stored in the RAM 38 associated with each subroutine so that once a complete word has been transmitted to the microcomputer 30 from the ROM 28, information can be retrieved from the RAM 38. Also, particular codes associated with words or with letters are likewise stored in the RAM 38. These codes may include instructions concerning the hard or soft consonants sounds, long or short vowel sounds, codes representing the grammatical parts of speech (nouns, verbs, pronouns, etc.) or codes specifying whether a word is properly spelled or misspelled and specifying any letters that should be blanked on the display 18.

THE KEYBOARD

The keyboard 12 is depicted in detail in FIG. 4. The keyboard 12 includes keys 16 arranged in a matrix with the top row of keys bearing the digits 0 through 9. These keys are used when the teaching machine 10 is operating in the syllable mode as a means for identifying the number of syllables in a word. The second, third, and fourth lateral rows of keys contain the letters of the English alphabet. These alphabet keys are used to supply missing letters in spelling and to enter the proper spelling of an entire word. The alphabet letter keys are also used to enter suffixes when the teaching machine 10 is operating in the suffix mode.

The key 16 labelled HC in the fourth row is used to establish operation of the teaching machine 10 in the hard consonant mode, so that the student can practice identification of words beginning with hard consonants which are imaged on the display 18. Similarly, the key labelled SC in the fourth row is used to condition operation of the teaching machine 10 to display a word set emphasizing soft consonants which the student is called upon to identify. By the same token the keys labelled LV and SV in the fifth row are respectively to identify words with long vowel sounds and words with short vowel sounds. The key labelled VB is used when the teaching machine 10 is conditioned to operate to display words which the student is called upon to identify by grammatical parts of speech. The particular key VB, when depressed by the student, indicates the decision of the student that the word displayed is a verb. Similarly, depression of the key labelled ADVB indicates that the student believes the word displayed is an adverb while the key NN and PRNN are used to identify nouns and pronouns.

The keys labelled RI and WR are used when the machine 10 is conditioned for operation in the spelling mode. That is, the key RI is used to signal a word which is correctly spelled while the key WR is used to identify a misspelled word. The key labelled SFX is used to condition operation of the teaching machine 10 to display word roots to which the student is called upon to add suffixes. As noted, the particular suffixes are added by depression of the alphabet letter keys in rows 2,3 and 4.

The key RE in row 6 is used to reset the master microcomputer 30. This may be necessary should power be momentarily interrupted or should the student make an error in initiating a program mode sequence. The key TI is used to establish a timed display of words. As previously explained, one utilization of the device is to encourage tachistoscopic learning. Normally, depression of the TI key should be followed by a numerically graded level of difficulty 0 through 9. This level of difficulty, of course, can be entered by depression of one of the keys in the first row. Thus, depression of the key TI followed by depression of the key 0 will cause each of a series of words to be displayed for two seconds on the display 18. Depression of the key TI followed by depression of the key 9 will cause display of the words for only 0.01 seconds. In this mode of operation, the words are simply seen and orally pronounced by the student, or seen and written by the student, or seen and reviewed by the student. No action by the student is required to select further words in the word set once operation in this mode is initiated.

The STD button is used to preliminarily condition the teaching machine 10 for standard operation. When the STD button is depressed prior to selecting a particular mode of operation, the selection of each word which is to be imaged on the display 18 is initiated by the depression of the GO button in the lower righthand corner of FIG. 4. Unless the GO button is depressed, the previously imaged word will remain on the display 18 and the master microcomputer 30 will not cause additional random word selections to occur.

Depression of the key SEMI in row 6, on the otherhand, requires the student to depress the GO button, but if the GO button is not depressed within a prescribed period of time, the teaching machine 10 scores a wrong answer and progresses to the next word. Depression of the AUTO button causes words to be selected at time intervals throughout the word presentation sequence. Once the GO button is initially depressed to start the sequence, it need not be activated further, since it will not alter the time during which each word is automatically displayed.

The CON button is used to initiate operation of the teaching machine 10 to assemble a word to practice a consonant sound to be identified. Depression of the CON button must be followed by depression of one of the alphabet alter buttons for a consonant in rows 2,3 and 4 to assemble a word set emphasizing words beginning with the particular consonant selected. The GO button must then be depressed to initiate imaging. With the display of each word, which begins with a consonant, the student is called upon to depress the alphabet character to identify that consonant. Similarly, depression of the VOW button causes a word set to be assembled stressing a particular vowel series in order to gain practice in the recognition of vowel sounds. Depression of the VOW button must be followed by depression of one or more of the alphabet keys for vowels in rows 2, 3 and 4. The Go button must thereafter be depressed to bring the first word image into view on the display 18. The PR button is used to identify a concious attempt to alter the particular program mode of operation. That is, if the teaching machine 10 has been operating in tachistoscopic mode, which was initially established by depression of the TI button, and it is desired to operate the device in the suffix mode, two steps are required. First, the PR button must be depressed. This causes the master microcomputer 30 to erase its present program subroutine from temporary memory, although all of the subroutines are permanently stored in the ROM 28. Thereafter, depression of the SFX button will prompt the master microcomputer 30 to copy the program subroutine for the suffix word root presentation series into internal temporary memory storage. The microcomputer 30 will then proceed to perform this subroutine and present images of word roots to which suffixes should be added by the student upon the subsequent actuation of the GO button.

The SP button is used initiate the spelling sequence. In this sequence, words in a word set are imaged on the display 18. The words include correctly and incorrectly spelled versions, and the student must identify whether or not the word is correctly spelled by depressing either the RI or the WR button. If the WR button is depressed, and indeed the word is misspelled, the student must then proceed to properly spell the word using the alphabet letter keys, on the keyboard 12.

The last button 90 in the second row and the last button 92 in the third row of the keyboard 12 are labelled with arrows directed to the left and to the right respectively. The functions of these buttons are explained in conjunction with the cursor control.

CURSOR CONTROL

As previously noted it may be desirable for a cursor, such as depicted at 80 in FIG. 2, to be used as a marker for the student operating the teaching machine 10 to point to a particular digit or space between digits. The cursor control is performed through the buttons 90 and 92 depicted in FIG. 4. A single momentary depression of the button 90 will pass a signal to the character generator 54 to produce an image of a cursor arrow at 80. The arrow 80 will appear at a character position or between character positions in the display 18, as illustrated in FIG. 2. Continued depression of the button 90 will decrement a counter in the digit driver control 48 to cause the image of the cursor 80 to be illuminated one half position to the left of the location of its initial appearance. Continued depression of the button 90 will cause the cursor 80 to move to the left in half step increments until it is at the character positions, or between character positions, as desired by the operator. Release of the button 90 then passes a signal to the slave microcomputer 42 indicative of the position of the cursor 80. This signal is compared with a "correct" position for the cursor 80, as determined by the master microcomputer 30. To de-energize illumination of the cursor 80, the button 90 is again momentarily depressed.

Manipulation of the button 92 in the foregoing manner achieves comparable results in moving the cursor 80 to the right in the display 18.

Positioning the cursor 80 at a character position in the display 18 is normally used as a means of identifying erroneous lettes in misspelled words or in inserting omitted letters in incomplete words. The cursor 80 may also be located between character, or digit, positions in the display 18 offset from a digit position so that it points between adjacent digits. Positioning in this manner is performed in connection with the identification of demarkations between syllables in words displayed on the display 18, for example.

To further explain the operation of the invention, exemplary operations performed in conjunction with different types of operating modes are useful.

VERB MODE

To operate the teaching machine 10 in the verb mode, to display a predominant number of verbs within a word set, the PR program button is first depressed to clear any previous mode program from the master microcomputer 30. Depression of the PR button is followed by depression of the VB button. This information is sufficient to direct the microcomputer 30 to draw the program subroutine for a presentation sequence emphasizing verbs from the ROM 28. The operating mode subroutine assembles a word set by defining the memory address locations in the ROM 28 from which words can be drawn, and the numbers of each type of word which should be utilized. That is, the words which may appear on the display 18 when operating in the verb sequence mode will be drawn from the same word sets as the words which would appear while operating in the noun or pronoun modes. However, the number of verbs which are included when operating in the verb set will be considerably greater than when operating in either the noun or pronoun mode. Conversely, when operating in the noun or pronoun mode, the program will be weighted accordingly.

Because of the relatively random time at which the GO button is pressed, with respect to the instantaneous address appearing on the bus 36 from the master microcomputer 30 at any given instant in time, random, or psuedo random selections of words for display are made. Depression of the GO button causes an interrupt signal to be transmitted from the slave microcomputer 42 to the master microcomputer 30 on line 118. This signal causes READ signal to be transmitted to the ROM 28 on line 129, so that the contents at the address momentarily specified are read into the master microcomputer 30. As the letters of the word are drawn from memory storage in the ROM 28, they are temporarily stored in the RAM 38 by transmission of a WRITE signal on line 124 and by transmission of the ASCII codes of the letter information on bus 40 from the microcomputer 30. When all of the letters of the word have been written into the RAM 38, the word is taken from the RAM and transmitted on bus 40 back to the microcomputer 30. The word is retained in the microcomputer 30 and the ASCII codes for the letters of the word are sequentially transmitted on bus 40 to the slave microcomputer 42 for imaging on the display 18. Once the image appears, the student is in a position to identify whether or not the word is a verb. If it is, the student presses the RI button. If not, the student presses the WR button.

In the meantime, the microcomputer has itself ascertained the code originally associated with the word from the ROM 28 and enters this code into an internal comparator. If the student answers the question properly, by depressing the appropriate one of the RI or WR buttons, the code for that button is produced in the slave microcomputer 42. This code is programmed to match the code temporarily stored in the master microcomputer 30. The code generated by the slave microcomputer 42 from depression of the correct key (RI or WR) will be transmitted from the slave microcomputer 42 to the master microcomputer 30. There it is entered into the comparator already containing the correct code. If there is a match, an indication of correctness is transmitted on the bus 40 from the master microcomputer 30 to the slave microcomputer 42. An indication of correctness is then transmitted to the display 18 to illuminate the indicator 22 by a signal from the slave microcomputer on line 150. If the incorrect answer is reached, the opposite signal is transmitted on line 150 and the slave microcomputer 42 calls upon the master microcomputer 30 to again present the word to the display 18 for proper identification of the correctness of the grammatical part of speech by the student. Also, an indication of correctness or incorrectness is recorded by the master microcomputer 30 in the RAM 38 for accumulation to reach a total score for the program subroutine sequence.

The foregoing sequence of steps are repeated with each depression of the GO button. As words are selected internally by the random selection process by the master microcomputer 30, the addresses of the words previously displayed are eliminated from those which the microcomputer 30 is allowed to call from memory in the ROM 28.

A corresponding sequence of events is followed in connection with operation in either the noun identification mode, the adverb identification mode or the pronoun identification mode.

Identification of particular sounds may be identified by depressing one of the buttons HC,SC,LV or SV. If the PR button is depressed, and thereafter the HC button is depressed, a subroutine associated with presenting a word set to the student with an emphasis on hard consonants is called from memory storage in the ROM 28 and temporarily entered in the microcomputer 30. Again, particular addresses are defined within the ROM 28 from which psuedo random selection occurs by subsequent depression of the GO button. As words are called out of the ROM 28 and their characteristic as either beginning with a hard consonant or not beginning with a hard consonant is determined, the ROM addresses of the selected words are eliminated from further consideration. With any of the foregoing consonant or vowel sound subroutines, the student responds by depressing either the HC or SC button, in the case of consonants, or the LV or SV button, in the case of vowels. By this means he either correctly or incorrectly identifies the characteristic sound of the word displayed. The student's response is encoded by the slave microcomputer 42 and transmitted to the comparator of the master microcomputer 30 for a determination as to whether an indication of correctness should be displayed by illuminating the light 22, or an indication of incorrectness should be displayed by illuminating the light 24. Again, scores are kept throughout the program subroutine sequence.

CONSONANT AND VOWEL IDENTIFICATION

Depession of the PR button, followed by depression of either the CON or VOW button calls a program subroutine from ROM 28 to the master microcomputer 30 to present a program of very elemental instruction. This program selects individual letters for display. These letters must be identified as either vowels or consonants by depression of the appropriate CON or VOW button. If properly identified as a consonant, a matching consonant code is derived from the CON switch depressed. This code is then compared with the corresponding code entered into the comparator in the master microcomputer 30 according to the program subroutine. Again indications or correctness and incorrectness are provided as before. The only difference between operation in the CON mode or operation in the VOW mode is the relative probability of frequency of occurrence of either vowels or consonants for display. This probablity is governed by the program, although actual selection of the letter for display is controlled by the random selection operation previously described.

SPELLING MODE

With sequential operation of the PR and SP buttons, words are randomly selected for imaging on the display 18 but with a selected letter or letters blanked therefrom. The particular letters chosen for blanking may be either performed initially in the storage of words in the ROM 28, or it may be performed according to steps outlined in the program subroutine. In either event, the student is called upon to supply the missing letters in the correct sequence. Depression of the appropriate alphabet letter switches in the display 12 are sensed by the analog detector 64, and encoded representations thereof are transmitted from the slave microcomputer 42 to the master microcomputer 30 for comparison in the internal comparator with the code of the correct letter.

Intermixed with the missing letter words are correctly spelled and misspelled words. If a correctly spelled word appears in the display 18, the student must choose whether to depress either the RI or WR button. If the word is indeed correctly spelled, depression of the RI button will cause a code to be transmitted from the slave microcomputer 42 to the master microcomputer 30 which matches a corresponding code stored in a comparator in the microcomputer 30. This results in the transmission of an indication of correctness to the indicator array 20. Conversely, depression of the WR button will result in the display of an indication of incorrectness to the indicator 24.

If a misspelled word is presented on a display 18 and is properly identified as such by depression of the WR button, the student must use the alphabet letter buttons to correctly spell the word. Failure to do so will result in a penalty in a secondary score which totals the number of misspelled words properly identified as such, and for which proper spelling is provided.

SUFFIX MODE

Despression of the PR button followed by actuation of the SFX button allows word roots to be randomly selected from a program set as defined by the master microcomputer 30. Once received in the microcomputer 30 by the random selected process, valid suffixes are determined according to accepted rules of word structure construction. Encoded versions of all of the words thereby created are stored in the RAM 38.

As the student provides proper word suffixes, registration and comparison are effectuated in the master microcomputer 30 in the manner previously described. Once selected, a word containing a valid suffix is eliminated from the remaining possible choices stored in the RAM 38. When all words having suffixes based on the root word have been entered by the student, the image of the letter group of the root word is removed from the display 18. The teaching machine 10 will then respond to depression of the GO button to randomly select another root word and the process is repeated.

AUTOMATIC AND SEMIAUTOMATIC OPERATION

The foregoing program subroutines have been discussed in conjunction with a requirement for depression of the GO button in order to advance from one word to the next. This manner of operation is achieved by depressing the STD button before depressing the PR button to select a program sequence mode of operation. Operation in this manner will continue until either the SEMI or AUTO button is depressed. Upon depression of the SEMI button, operation will proceed as previously described with utilization of the GO button in the standard mode of operation, but with the exception that a time control is applied. This means that a student has a limited time within which to respond and to depress the GO button. Failure to respond within this time will result in the scoring of a failure to respond, which may be taken as an incorrect response. In automatic operation, which is initiated by depression of the AUTO button, the GO button is depressed but once at the beginning of the sequence following selection of the program mode of operation. Thereafter, words are automatically presented after the elapse of a predetermined time interval regardless of whether or not a response is provided by the student. As previously explained, automatic operation lends itself readily to use in tachistoscopic learning.

While undoubtedly various alterations and modifications of the invention will become readily apparent to those skilled in the art the scope of the invention should not be limited to the specific embodiment or steps described in connection therewith. It should be appreciated that numerous program alterations to the invention can be performed by persons familiar with micro processor programming technology. Reference to the publication "MCS-48TM Single Chip Microcomputer Product Description", by Intel Corporation of Santa Clara, Calif. published in 1977, printing identification number A198/0677/25K CP, will undoubtedly be of assistance in formulation of specific program subroutines in terms of the microcode program set employed in connection with the components contemplated.

One useful alternative embodiment of the invention to that depicted in the drawings involves a system in which a conventional kinescope of a commercial television screen is used as the display 18. Such a display is particularly attractive for use in maintaining the interest of youthful students, and additionally allows a large enough display so that the teaching machine 10 could be conditioned to accept dual inputs. This would allow students to compete with each other in arriving at correct scores.

I claim:

1. A portable machine for teaching students to read comprising:
   keyboard means having manually actuable switches at least some of which correspond to separate grammatical characteristics,
   display means comprised of a plurality of character positions for providing a visual display of words by generating images of words internally transmitted thereto in electronically encoded form,
   indicators of correctness and incorrectness,
   word set defining means for storing a multiplicity of words in electronically encoded form, and for assembling said words in sets wherein said sets are separately selected in response to separate actuation of said switch means corresponding to structural characteristics of words,
   random selection means connected to said word set defining means for selecting words at random from among words in a selected set and for transmitting words so selected to said display means for generation of an image containing at least one such word for visual observation,
   means for internally associating the actuation of at least one of said manually actuable switches with each of said displayed words,
   comparison means for sensing actuation of at least one manually selected switch and for ascertaining whether said actuation of all selected switches is internally associated with said image, and for providing an output indicative of the comparison results to said indicators of correctness and incorrectness.

2. Apparatus according to claim 1 further characterized in that said means for internally associating includes means for storing an electronic indication of the structural characteristic of a word of a long vowel sound to encoded words randomly selected for display from among words assembled by said word set defining means, and further characterized in that said keyboard means includes at least one key for indicating a long vowel sound in association with a word in said visual display.

3. Apparatus according to claim 1 further characterized in that said means for internally associating includes means for storing an electronic indication of the structural characteristic of the numbers of syllables in an encoded word selected for display, and further characterized in that said keyboard includes separate keys associated with numbers, whereby the number of syllables in a displayed word can be visually derived and entered through said keyboard to provide a signal to one of said indicators.

4. Apparatus according to claim 3 further characterized in that said means for internally associating further includes means for designating syllable demarkations within a word appearing on said display means and means for altering said image of a displayed word by increasing spacing of letters thereof between adjacent syllables upon depression of a switch in said keyboard means.

5. Apparatus according to claim 1 further comprising means for suppressing generation of the image of at least one letter in a word appearing on said display and means for storing an electronically encoded form of a letter so suppressed, and further characterized in that said keyboard means also includes switches for supplying a missing letter of a word as a signal to one of said indicators.

6. Apparatus according to claim 1 further characterized in that said means for internally associating includes means for storing an electronic indication of the structural characteristic of words of a short vowel sound to encoded words randomly selectd for display from among words assembled by said word set defining means, and further characterized in that said keyboard means includes at least one key for indicating a short vowel sound in association with a word in said visual display.

7. A portable machine according to claim 1 further comprising a cursor in said display means for designating selected portions of images of words in said visual display, and further characterized in that at least one of said manually actuable switches is a cursor control used to move said cursor relative to said visual display.

8. A portable machine according to claim 7 further characterized in that said cursor control is arranged to move said cursor to locations aligned with selected character positions in said visual display.

9. A portable machine according to claim 7 further characterized in that said cursor control is arranged to move said cursor to locations between selected character positions in said visual display.

10. A portable machine for teaching students to read comprising:

visual display means including a cursor for receiving encoded letter combinations to provide visual images thereof as transmitted thereto, storage means having a plurality of memory locations in which sets of letter combinations are separately stored in electronically encoded form, logic processing means to address said memory locations one at a time and to provide to said visual display means encoded letter combinations as said letter combinations are received from said addressed memory locations, word selection means connected to said storage means to randomly select from among the addresses of letter combinations addressed an to sequentially extract leter combinations therefrom and transfer said extracted leter combinations at said selected addresses to said logic processing means for display, correctness and incorrectness indicators, console means having manually actuable switches for generating electronic signals for different characteristics of words, including a signal to said cursor to designate particular letters among said letter combinations and further characterized in that said logic processing means is adapted to ascertain the existance of a particular structural characteristic of words associated with each letter combination received from said addressed memory location, to store an encoded indication of said existence and the location thereof among the letters of said letter combination, and to draw said encoded indication from memory storage upon subsequent receipt of at least one electronic signal from said console means for comparison therebetween, and comparator means connected to said logic processing means for receiving said electronic signals from said console means and the most recently stored encoded indication of existence and location of a particular structural characteristic of words and for providing an output indication of comparison results to one of said correctness and incorrectness indicators.

11. Apparatus according to claim 10 further comprising timing means for triggering renewed operation of said word selection means upon the elapse of a predetermined cycle interval.

12. Apparatus according to claim 11 further characterized in that said timing means provides a gating signal to said visual display means for a tachistoscopic viewing interval defined within said predetermined cycle interval.

13. Apparatus according to claim 10 further comprising a manually operable trigger means connected to cyclically operate said word selection means.

14. Apparatus according to claim 10 further characterized in that said letter combinations are words, at least some of which include prefixes, and said storage means contains an encoded indication of prefix existence and location in said letter combinations for those words having prefixes, correctness and incorrectness indicators, console means having at least one manually actuable switch for generating electronic signals for specifying the existence and location of a prefix in said letter combinations, and comparator means connected to said logic processing means for providing an output indication of comparison results between said electronic signals from said console means and from said storage means.

15. Apparatus according to claim 10 further characterized in that at least some of said letter combinations are word roots, with at least some of which suffixes may be incorporated to form words with suffix endings, and further characterized in that said storage means contains an encoded indication of those word roots with which suffixes may be incorporated to form words with suffix endings, and further comprising temporary memory storage means, and said console means further comprises manually actuable switches for generating electronic signals for different alphabet letters, and further characterized in that said logic processing means is adapted to ascertain valid language suffix letter combinations which form language words with suffix endings when prefixed by the word root most recently selected by said word selection means, and means for transferring said suffix letter combinations to said temporary memory storage means, and to draw said suffix letter combinations from said temporary memory storage means upon subsequent receipt of letter combinations manually entered into said console means for comparison therewith, and said comparator means is connected to said logic processing means to receive manually entered letter combinations from said console means and to receive the suffix letter combinations stored in said temporary memory storage means in association with the most recently selected word root, and to provide an output indication of comparison results to one of said correctness and incorrectness indicators.

* * * * *

UNITED STATES PATENT OFFICE
CERTIFICATE OF CORRECTION

Patent No. 4,245,405          Dated January 20, 1981

Inventor(s) Ming T. Lien and Eric F. Burtis

It is certified that error appears in the above-identified patent and that said Letters Patent are hereby corrected as shown below:

Column 1, line 29, delete "machines employees" and substitute therefor -- machine employs --.

Column 2, line 16, delete "constant" and substitute therefor -- consonant --.

Column 2, line 27, insert a comma after "verbs".

Column 12, line 1, delete "tans" and substitute therefor -- tains --.

Column 13, line 51, delete "concious" and substitute therefor -- conscious --.

Column 14, line 1, after "used" insert -- to --.

Column 16, line 54, delete "or" and substitute therefore -- of --.

Column 19, line 43, delete "selctd" and substitute therefore -- selected --.

Column 20, line 11, delete "an" and substitute therefor -- and --.

UNITED STATES PATENT OFFICE
CERTIFICATE OF CORRECTION

Patent No. 4,245,405　　　　　　　　　Dated January 20, 1981

Inventor(s) Ming T. Lien and Eric F. Burtis

It is certified that error appears in the above-identified patent and that said Letters Patent are hereby corrected as shown below:

Column 20, line 12, delete "leter" and substitute therefor
-- letter --.

Column 20, line 13, delete "leter" and substitute therefor
-- letter --.

Signed and Sealed this

Thirteenth Day of October 1981

[SEAL]

Attest:

GERALD J. MOSSINGHOFF

Attesting Officer　　　　　Commissioner of Patents and Trademarks